(12) United States Patent
Zuroski et al.

(10) Patent No.: US 9,970,351 B2
(45) Date of Patent: May 15, 2018

(54) HIGH FREQUENCY SILENCER FOR AN AIR INDUCTION SYSTEM

(71) Applicant: Cummins Filtration IP, Inc., Columbus, IN (US)

(72) Inventors: Michael T. Zuroski, Sun Prairie, WI (US); Paul A. Hayes, Columbus, IN (US)

(73) Assignee: Cummins Filtration IP, Inc., Columbus, IN (US)

( * ) Notice: Subject to any disclaimer, the term of this patent is extended or adjusted under 35 U.S.C. 154(b) by 184 days.

(21) Appl. No.: 15/036,949

(22) PCT Filed: Nov. 18, 2014

(86) PCT No.: PCT/US2014/066204
§ 371 (c)(1),
(2) Date: May 16, 2016

(87) PCT Pub. No.: WO2015/077245
PCT Pub. Date: May 28, 2015

(65) Prior Publication Data
US 2016/0258355 A1 Sep. 8, 2016

Related U.S. Application Data

(60) Provisional application No. 61/906,292, filed on Nov. 19, 2013, provisional application No. 61/943,087, filed on Feb. 21, 2014.

(51) Int. Cl.

| | | |
|---|---|---|
| F02B 77/13 | (2006.01) | |
| F02M 35/14 | (2006.01) | |
| F02M 35/024 | (2006.01) | |
| F02C 7/045 | (2006.01) | |
| B01D 46/42 | (2006.01) | |
| F02M 35/12 | (2006.01) | |

(52) U.S. Cl.
CPC .......... *F02B 77/13* (2013.01); *B01D 46/4236* (2013.01); *F02C 7/045* (2013.01);
(Continued)

(58) Field of Classification Search
CPC . F02B 77/13; B01D 46/4236; B01D 46/0005; B01D 2267/40;
(Continued)

(56) References Cited

U.S. PATENT DOCUMENTS 2,999,562 A * 9/1961 Lechtenberg .......... B01D 46/10
  264/DIG. 48
4,258,821 A * 3/1981 Wendt .................. F04D 29/664
  181/202
5,203,895 A * 4/1993 Berto ..................... B01D 46/24
  55/385.3

(Continued)

FOREIGN PATENT DOCUMENTS

EP  2 775 131  9/2014
JP  S62255565  11/1987
(Continued)

OTHER PUBLICATIONS

Extended Search Report issued for European Patent Application No. 14863808.3, dated May 12, 2017, 9 pages.
(Continued)

*Primary Examiner* — Lindsay Low
*Assistant Examiner* — John Bailey
(74) *Attorney, Agent, or Firm* — Foley & Lardner LLP

(57) ABSTRACT

A filter assembly including a filter media sized for positioning within an air induction system, the filter media possessing a first side and a second side substantially opposite the first side. The filter assembly includes a layer of sound absorbing foam positioned adjacent one of the first side of the filter media and the second side of the filter media, the sound absorbing foam including a plurality of perforations therein, the plurality of perforations permitting air to flow through the filter media and the layer of sound absorbing foam.

21 Claims, 6 Drawing Sheets

(52) U.S. Cl.
CPC .... *F02M 35/024* (2013.01); *F02M 35/02458* (2013.01); *F02M 35/02466* (2013.01); *F02M 35/02491* (2013.01); *F02M 35/1272* (2013.01); *F02M 35/14* (2013.01); *F05D 2220/40* (2013.01)

(58) Field of Classification Search
CPC ........ B01D 2259/4566; B01D 2279/60; F02C 7/045; F02M 35/024; F02M 35/02458; F02M 35/02466; F02M 35/02491; F02M 35/1272; F02M 35/14; F02M 35/1211; F02M 35/12; F02M 35/1216; F02M 35/1227; F02M 35/1266; F02M 35/1277; F05D 2220/40; F04B 39/16; F01N 13/007; F01N 1/04; G10K 11/16; G10K 11/168; G10K 11/172
USPC .... 123/184.26, 184.51, 184.53, 184.55, 434, 123/198 E; 181/204, 205, 214, 222, 229, 181/252, 256, 293; 137/15.1; 239/265.13; 415/119; 55/385.3; 261/107; 29/889.4; 219/532; 96/380, 96/383, 387
See application file for complete search history.

(56) References Cited

U.S. PATENT DOCUMENTS

| | | | |
|---|---|---|---|
| 5,289,848 A | 3/1994 | Jenisch, Jr. | |
| 5,300,178 A * | 4/1994 | Nelson | B29C 63/0082 156/292 |
| 5,633,067 A * | 5/1997 | Illbruck | B60R 13/0838 123/195 C |
| 5,681,072 A * | 10/1997 | Stricker | B60R 13/0838 181/205 |
| 5,841,080 A * | 11/1998 | Iida | F01N 1/10 15/326 |
| 5,859,393 A | 1/1999 | Cummins et al. | |
| 6,260,658 B1 * | 7/2001 | Darrell | F01D 25/30 181/224 |
| 6,348,086 B1 * | 2/2002 | Harms | B01D 46/0045 55/385.3 |
| 6,688,424 B1 * | 2/2004 | Nakada | B60K 11/04 180/68.1 |
| 7,041,146 B2 * | 5/2006 | Bugli | B01D 46/0023 123/198 E |
| 7,338,547 B2 * | 3/2008 | Johnson | B01D 39/1669 174/382 |
| 7,441,532 B2 * | 10/2008 | Disch | B01D 46/0005 123/198 E |
| 7,501,004 B2 * | 3/2009 | Tschech | B01D 46/0005 123/198 E |
| 7,802,651 B2 * | 9/2010 | Park | B01D 46/10 181/224 |
| 7,998,232 B2 * | 8/2011 | Krueger | B60R 21/34 180/274 |
| 8,015,848 B2 * | 9/2011 | Colon | A47L 15/4257 68/3 R |
| 8,132,552 B2 * | 3/2012 | Matsumoto | F02M 35/1238 123/184.61 |
| 9,133,615 B2 * | 9/2015 | Bischoff | G10K 11/168 |
| 9,404,451 B2 * | 8/2016 | Bernardo | B01D 4/236 |
| RE46,182 E * | 10/2016 | Weber | B01D 46/0004 |
| 9,592,918 B2 * | 3/2017 | Yu | B64D 33/06 |
| 9,771,868 B2 * | 9/2017 | Nesbitt | F02C 7/045 |
| 2003/0066706 A1 | 4/2003 | Cole et al. | |
| 2004/0003719 A1 * | 1/2004 | Le | B01D 39/1676 95/287 |
| 2004/0007421 A1 * | 1/2004 | Ueno | F02B 77/13 181/204 |
| 2004/0031248 A1 * | 2/2004 | Lindsay | B01D 46/0023 55/385.3 |
| 2004/0065288 A1 * | 4/2004 | Kino | F02M 35/1216 123/184.21 |
| 2004/0206058 A1 * | 10/2004 | Bugli | B01D 46/0005 55/385.3 |
| 2004/0244586 A1 * | 12/2004 | Schaerlund | B01D 46/0024 95/268 |
| 2005/0063868 A1 * | 3/2005 | Grimes | G01N 21/6447 422/82.05 |
| 2005/0076623 A1 | 4/2005 | Stenersen et al. | |
| 2005/0133302 A1 * | 6/2005 | Pfaffelhuber | B60R 13/08 181/293 |
| 2005/0252714 A1 * | 11/2005 | Goda | B29C 44/583 181/252 |
| 2007/0000467 A1 * | 1/2007 | Shaw | F02M 35/14 123/184.53 |
| 2007/0186894 A1 * | 8/2007 | Disch | B01D 46/0005 123/198 E |
| 2007/0292816 A1 | 12/2007 | Miller | |
| 2008/0053312 A1 * | 3/2008 | Redmann | B60R 13/0838 96/380 |
| 2008/0202848 A1 * | 8/2008 | Mueller | F02C 7/045 181/229 |
| 2008/0230619 A1 * | 9/2008 | Kirby | F24H 3/0405 237/81 |
| 2008/0236938 A1 * | 10/2008 | Pettipiece | F02M 35/1216 181/206 |
| 2009/0104024 A1 * | 4/2009 | Kay | F01D 5/147 415/161 |
| 2009/0178879 A1 * | 7/2009 | Park | B01D 46/10 181/224 |
| 2009/0241888 A1 * | 10/2009 | Koss | F02M 35/1216 123/184.53 |
| 2010/0018506 A1 * | 1/2010 | Elum | F02M 35/0203 123/518 |
| 2011/0023427 A1 * | 2/2011 | Srinivasan | F02M 35/024 55/385.3 |
| 2011/0107994 A1 * | 5/2011 | Satarino | F02M 35/10144 123/184.21 |
| 2011/0249829 A1 * | 10/2011 | Mah | B60R 13/08 381/86 |
| 2012/0141255 A1 * | 6/2012 | Nakazawa | F04D 29/664 415/121.2 |
| 2012/0204846 A1 * | 8/2012 | Schultz | F02M 25/06 123/573 |
| 2012/0292127 A1 * | 11/2012 | Teshima | F02M 35/10144 181/224 |
| 2012/0292128 A1 * | 11/2012 | Keesser | F01N 1/023 181/227 |
| 2013/0118830 A1 * | 5/2013 | Cursetjee | F24F 13/24 181/224 |
| 2013/0167727 A1 * | 7/2013 | Walker | F02M 35/14 96/381 |
| 2013/0327218 A1 * | 12/2013 | Izzi | B32B 5/022 95/281 |
| 2014/0131135 A1 * | 5/2014 | Hinson | G10K 11/16 181/284 |
| 2015/0128808 A1 * | 5/2015 | Bao | B60H 3/0608 96/381 |
| 2016/0195049 A1 * | 7/2016 | Zirkelbach | F02M 35/1216 181/229 |
| 2017/0174356 A1 * | 6/2017 | Lucas | B64D 33/02 |

FOREIGN PATENT DOCUMENTS

| | | |
|---|---|---|
| JP | H09264216 | 10/1997 |
| JP | 2004-184640 | 7/2004 |
| WO | WO 01/86152 | 11/2001 |

OTHER PUBLICATIONS

International Search Report and Written Opinion for PCT/US2014/066204, dated Apr. 8, 2015, 8 pages.

* cited by examiner ns (SPL) reduc-
HIGH FREQUENCY SILENCER FOR AN AIR INDUCTION SYSTEM

CROSS-REFERENCE TO RELATED APPLICATIONS

The present application is a U.S. national stage application claiming the benefit of International Application No. PCT/US2014/066204, filed on Nov. 18, 2014. International Application No. PCT/US2014/066204 is related to U.S. Provisional Patent Application Ser. No. 61/906,292 entitled "HIGH FREQUENCY SILENCER FOR AN AIR INDUCTION SYSTEM," filed on Nov. 19, 2013, and to U.S. Provisional Patent Application Serial No. 61/943,087 think you entitled "HIGH FREQUENCY SILENCER FOR AN AIR INDUCTION SYSTEM," filed on Feb. 21, 2014. The contents of all three applications are hereby incorporated by reference in their entireties and for all purposes.

TECHNICAL FIELD

The present application relates to air induction systems. More particularly, the present application relates to air induction systems including noise reducing components therein.

BACKGROUND

The compressor section of a turbocharger generates high frequency sound related to the blade pass frequency of the compressor. The sound is generally in the range of 6 kHz-12 kHz. In the past, this sound was not very noticeable. More recently, however, as other sources of noise in a vehicle have been reduced, compressor noise has become more of an issue.

One conventional system for addressing the noise issue identified above involves the inclusion of a discrete, duct-based component, for example a lined duct, which may be referred to as a duct silencer. Such a component has a foam lining on the outer wall and has diametrical partitions dividing the duct cross-sectional area into multiple sections. This system can be effective at the aforementioned high frequencies, but the inner diameter of the duct partitions of the silencer must be on the order of the sound wavelength (approximately one inch in diameter). Because the inlet and outlet duct diameter of an air induction system is typically several times this size, partitions or other features are required to achieve the required smaller effective diameter. The partitions are fairly thick (e.g., about ⅜") because they contain numerous blind-hole, quarter wavelength resonators. The reduction in an overall cross-sectional area, combined with the circumferential ribs used to contain the foam, results in very high pressure drop at high air flow velocities, thereby reducing overall engine performance.

Another conventional arrangement for addressing the noise issue involves covering portions of the inside of the air filter housing. The portions of the air filter housing may be covered with a sound dampening or damping foam or other material. It has been observed that such an arrangement is not very effective unless large amounts of sound absorbing materials are used. However, using such large amounts of material becomes prohibitive from a packaging standpoint.

SUMMARY

Various embodiments provide for an air induction system comprising perforated sound absorbing material that is used in conjunction with an air filter element to reduce high frequency noise generated by the compressor in a turbocharged engine. According to such embodiments, sound reduction from the compressor section of a turbocharger can be achieved to a level at least comparable to that achieved by conventional silencers, with the arrangements discussed herein resulting in a lower pressure drop than what is observed in conventional silencers. In particular embodiments, an 8 decibel (dB) sound pressure level (SPL) reduction from 6 kHz-12 kHz frequency sound can be achieved.

One embodiment relates to a filter assembly. The filter assembly includes a filter media and a layer of sound absorbing foam. The filter media is sized for positioning within an air induction system. The filter media includes a first side and a second side substantially opposite the first side. The layer of sound absorbing foam is positioned adjacent one of the first side of the filter media and the second side of the filter media. The sound absorbing foam includes a plurality of perforations therein. The plurality of perforations permit air to flow through the filter media and the layer of sound absorbing foam.

Another embodiment relates to a filter assembly. The filter assembly includes a filter media and a plurality of strips of sound absorbing foam. The filter media is sized for positioning within an air induction system. The filter media possessing a first side and a second side substantially opposite the first side. The plurality of strips of sound absorbing foam are positioned adjacent one of the first side of the filter media and the second side of the filter media. The plurality of strips are spaced apart from one another thereby permitting air to flow through the filter media and past the layer of sound absorbing foam.

A further embodiment relates to an air induction system for an internal combustion engine. The system includes a filter assembly and a turbocharger. The filter assembly has a filter media and a sound absorbing foam. The filter media includes a clean side and a dirty side substantially opposite the clean side. The dirty side is configured to receive unfiltered air, and the clean side is configured to output filtered air. The sound absorbing foam is positioned adjacent one of the clean side of the filter media and the dirty side of the filter media. The turbocharger is configured to provide filtered air to the internal combustion engine. The turbocharger is positioned downstream of the clean side of the filter media.

These and other features, together with the organization and manner of operation thereof, will become apparent from the following detailed description when taken in conjunction with the accompanying drawings.

DETAILED DESCRIPTION OF VARIOUS EMBODIMENTS

Referring to the figures generally, the various embodiments disclosed herein relate to a sound absorption system for an air induction system. The sound absorption system may include a piece of sound absorbing foam. The sound absorbing foam may be placed on the "clean" (filtered) side of an air filter element of the air induction system. The sound absorbing foam may be perforated such that the sound absorbing foam minimally restricts air flow from the air induction system to another component (e.g., a combustion chamber of an internal combustion engine, the compressor portion of a turbocharger or supercharger, etc.). The perforations may be sized and arranged to damp sound having a high frequency (e.g., a frequency of approximately 6 kHz to 12 kHz).

Figure 1:
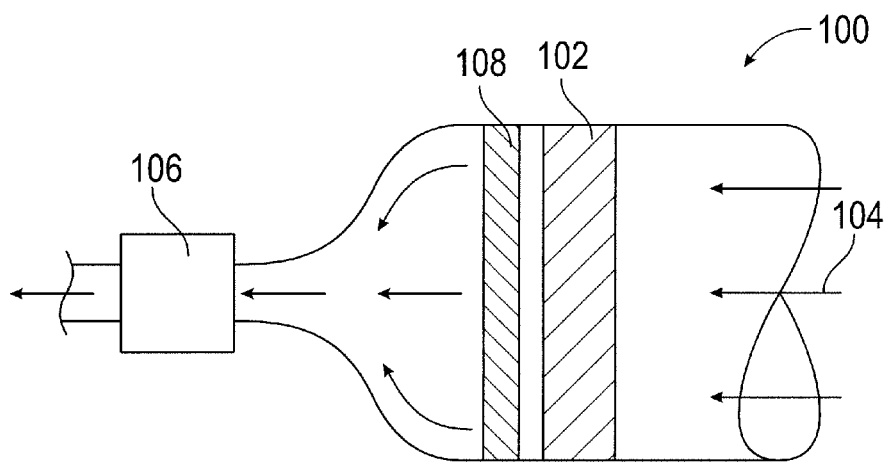
FIG. 1 is a simplified cross-sectional view of an air induction system according to an exemplary embodiment.

Referring to FIG. 1, a simplified cross-sectional view of an air induction system 100 is shown according to an exemplary embodiment. The air induction system 100 may be configured to provide clean air to various components of an internal combustion engine. Accordingly, the air induction system 100 includes an air filter element 102. The air filter element 102 is configured to clean air (shown by flow arrows 104) such that clean air may be provided to a component, such as the compressor side of a turbocharger 106. The compressor of the turbocharger 106 may generate high frequency noise. The noise may be on the order of approximately 6 kHz to 12 kHz. The noise may travel down the ducts of the air intact system 100.

The air intake system 100 includes a sound absorbing foam 108. As shown in FIG. 1, the sound absorbing foam 108 is on the "clean" (filtered) side of the air filter element 102 within the air routing duct of the air intake system 100. In other embodiments, however, the sound absorbing foam 108 may be placed against the opposite side of the air filter element 102 (i.e. on the "dirty" or unfiltered side of the air intake system 100). The sound absorbing foam 108 may be placed directly against a face of the air filter element 102 or may be spaced apart from the air filter element 102. The sound absorbing foam 108 may be adhered directly to the filter element 102, or it may be used as a stand-alone panel that is part of the air filter housing. The sound absorbing foam 108 may be removable and replaceable. The sound absorbing foam 108 may have a thickness of about one inch.

Figure 2:
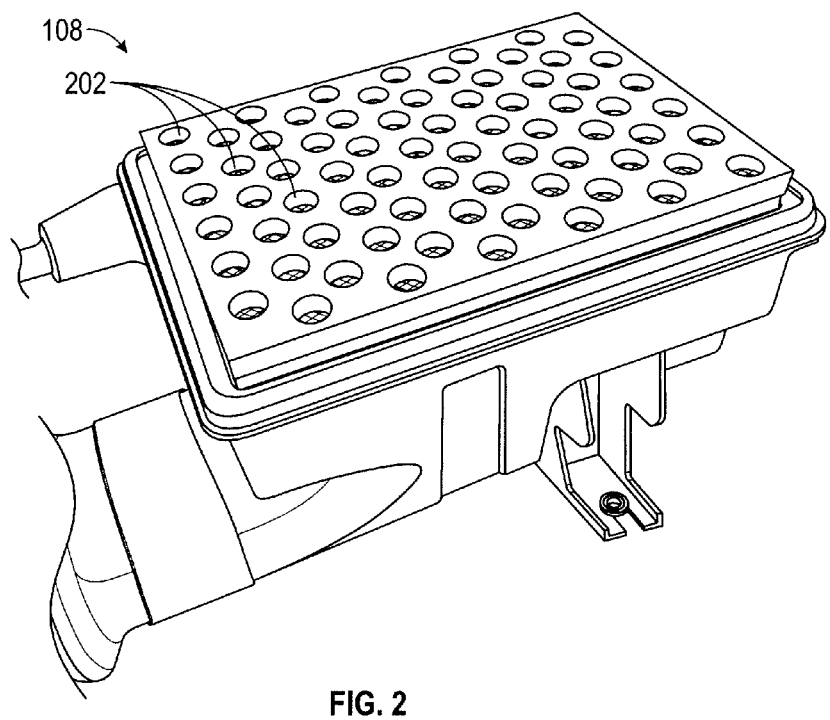
FIGS. 2 through 4 show different perspective views of the sound absorbing foam of the air induction system of FIG. 1.
Figure 3:
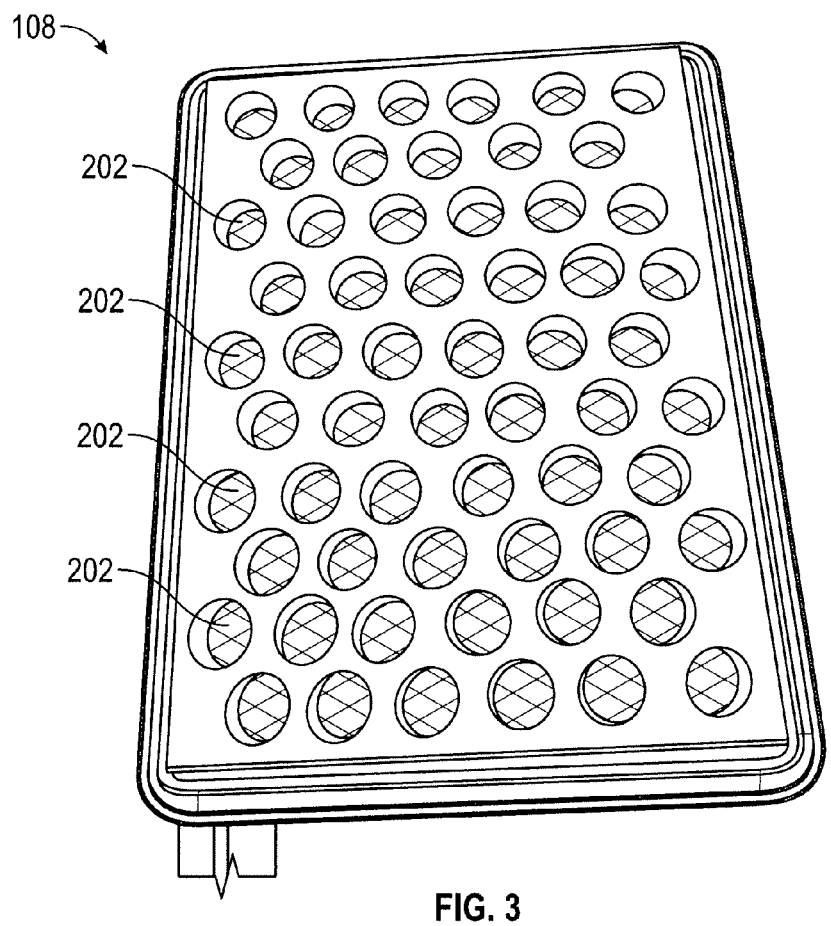
Figure 4:
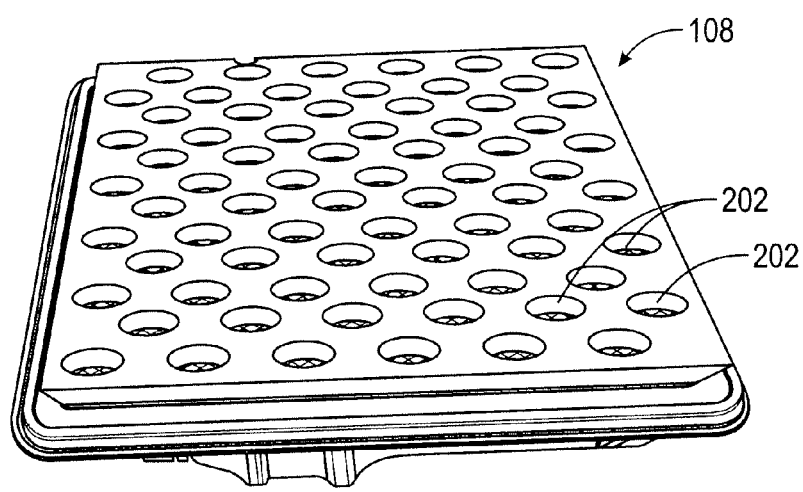

FIGS. 2 through 4, show different perspective views of the sound absorbing foam 108. As shown in FIGS. 2 through 4, the sound absorbing foam 108 is perforated with openings 202. In a particular implementation, the openings 202 are each approximately one inch in diameter and are closely spaced such that the openings occupy approximately 40-50% of a total area of a face of the sound absorbing foam 108, which results in an open area in the range of about 40 to 50 percent of a total area of the face, thereby allowing air to pass through the sound absorbing foam 108 without significant resistance. For example, a 7.5"×10.75" panel would have approximately 60 openings 202 therein. In another arrangement, openings 202 are approximately 0.75 inches in diameter and are spaced such that the openings occupy approximately 35-40% of a total area of the face of the sound absorbing foam 108, which results in a porosity of about 35 to 40 percent of a total area of the face. In such an arrangement, a 9"×10" panel would have approximately 77 openings 202 therein. Each opening 202 allows clean, filtered air to pass through, while absorbing at least a portion of the above mentioned noise. Accordingly, each opening 202 may function as a small, lined duct silencer. The individual openings 202 can be any size or shape, but are sized in relation to the thickness of the foam to provide adequate acoustic performance versus restriction.

Referring again to FIG. 1, the sound absorbing foam 108 is located in a section of the air induction system 100 having a relatively low air velocity (i.e., at a wider portion of the housing than the inlet to the compressor of the turbocharger 106). Accordingly, the observed pressure drop caused by the sound absorbing foam may be less than a traditional silencer. The observed pressure drop measured on-engine may be less than 0.5" $H_2O$ (0.12 kPa). This is significantly lower than observed pressure reductions caused by a traditional duct-based silencer system, which may be as high as 18" $H_2O$ (4.4 kPa) with some duct-based systems. In another arrangement, the observed pressure drop caused by the sound absorbing foam may be between approximately 0.5" of $H_2O$ and the pressure drop in a duct-based silencer can exceed 10" $H_2O$.

Figure 5:
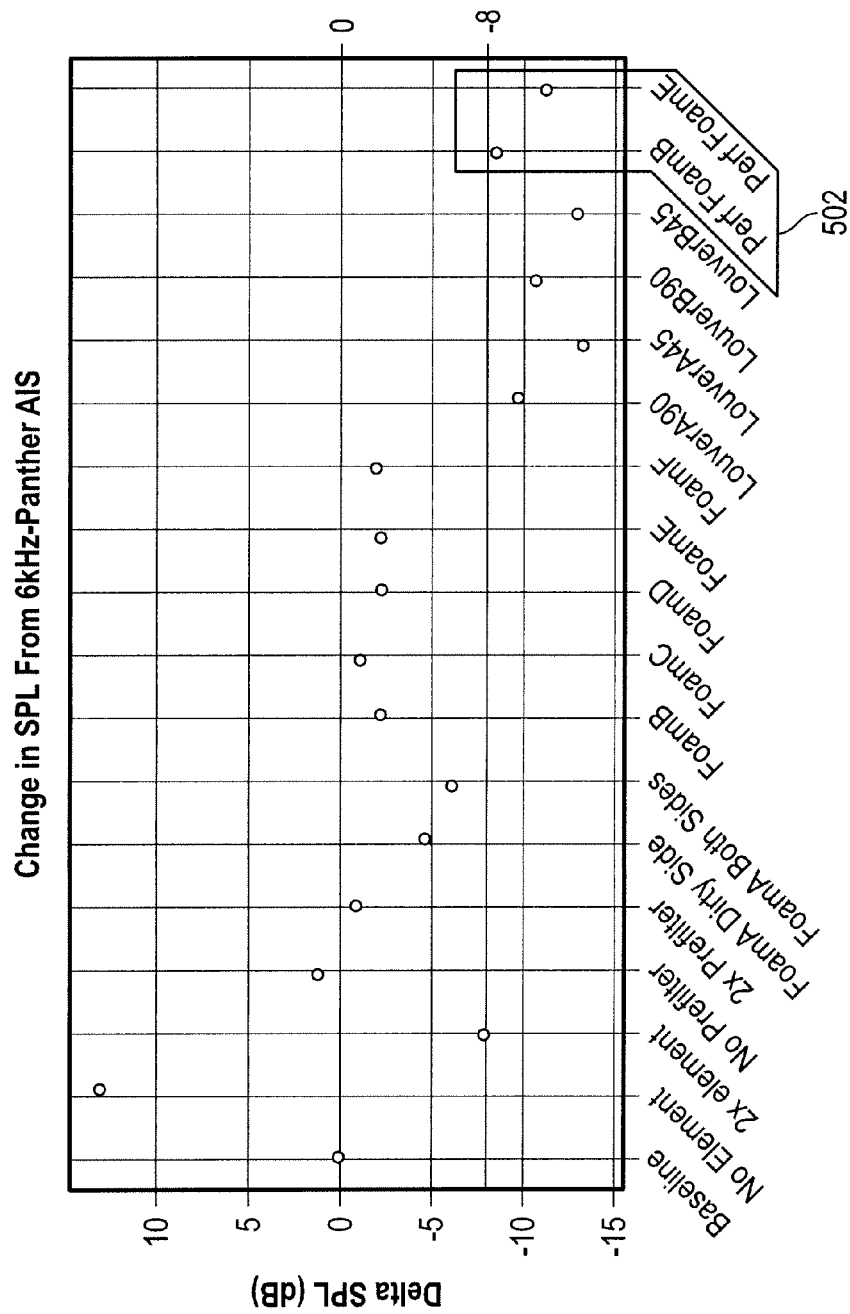
FIGS. 5 and 6 show various graphs detailing the sound damping performance of the sound absorbing foam of FIGS. 1-4.
Figure 6:
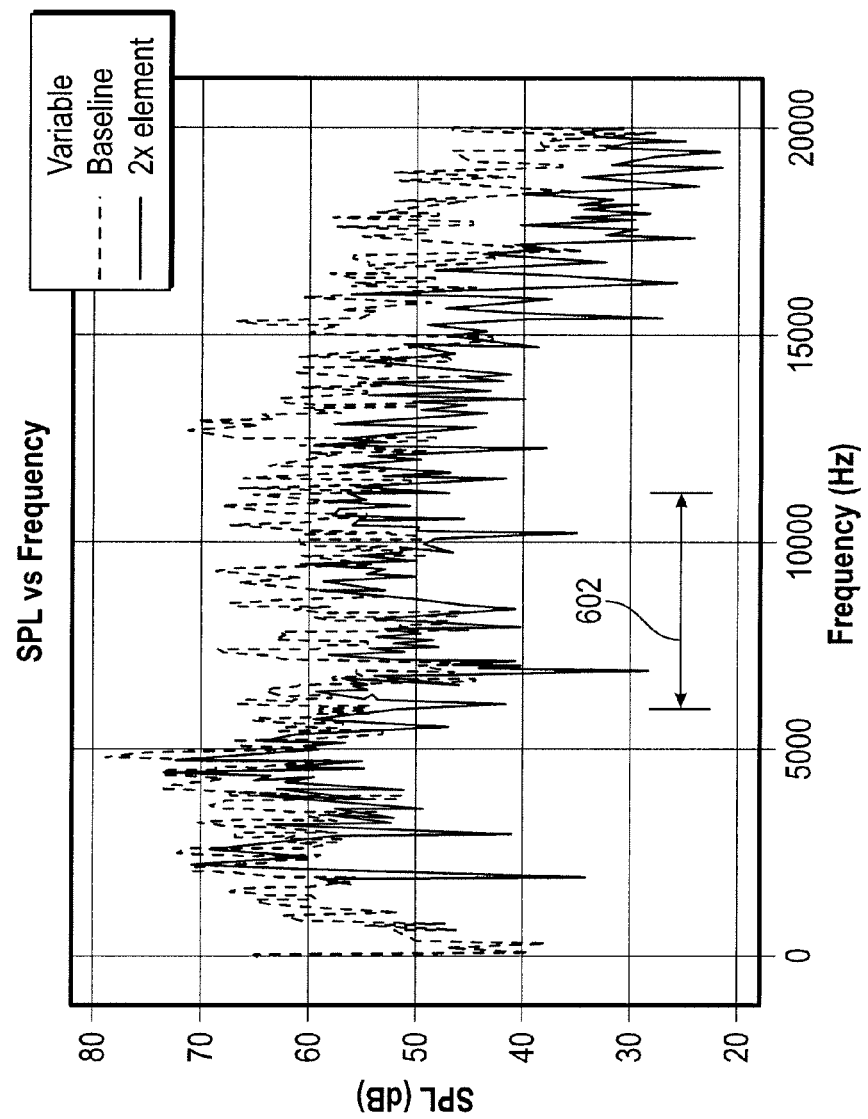

Referring to FIGS. 5 and 6, various graphs showing the sound damping performance of the sound absorbing foam 108 are shown from a bench test setup (i.e., these figures do not show data gathered during use with an internal combustion engine). As shown in FIG. 5, the noise damping effectiveness of perforated foam in an air intake system (e.g., sound damping foam 108) may cause a drop of approximately 8 to 11 decibels in the 6 kHz to 12 kHz range. As shown in FIG. 6, the sound emitted in the 6 kHz to 12 kHz range (designated with range 602) may be as high as approximately 70 decibels.

Figure 7:
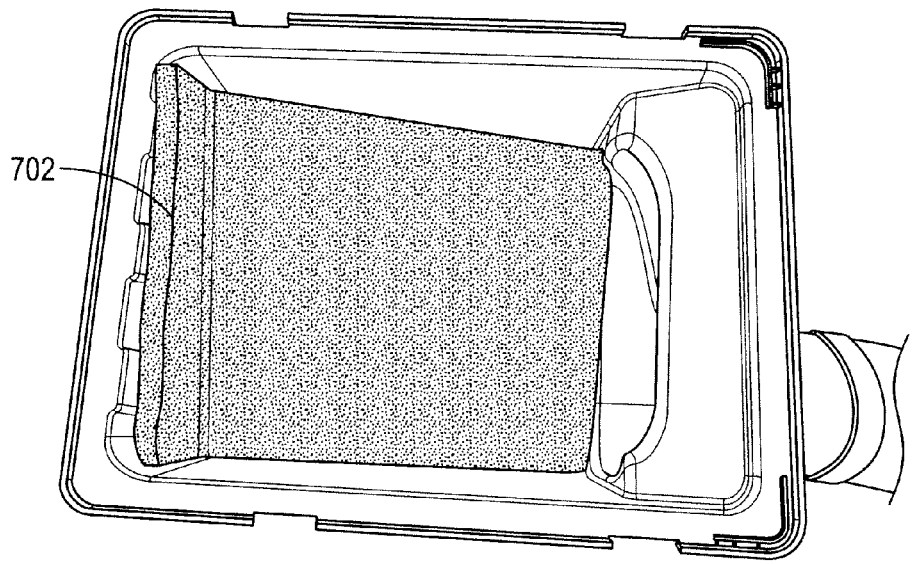
FIGS. 7 through 9 show other sound damping foam placements within an air intake system housing.
Figure 8:
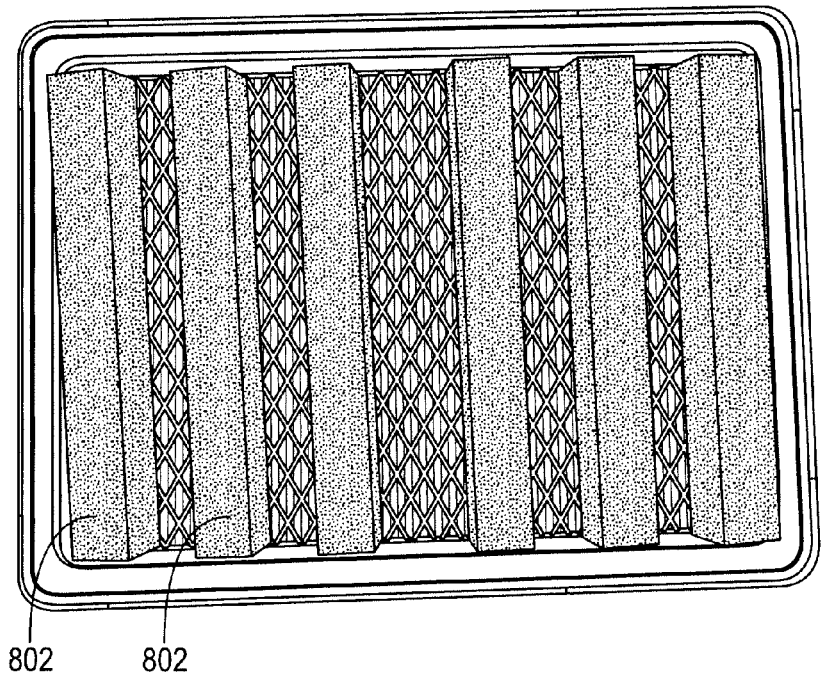
Figure 9:
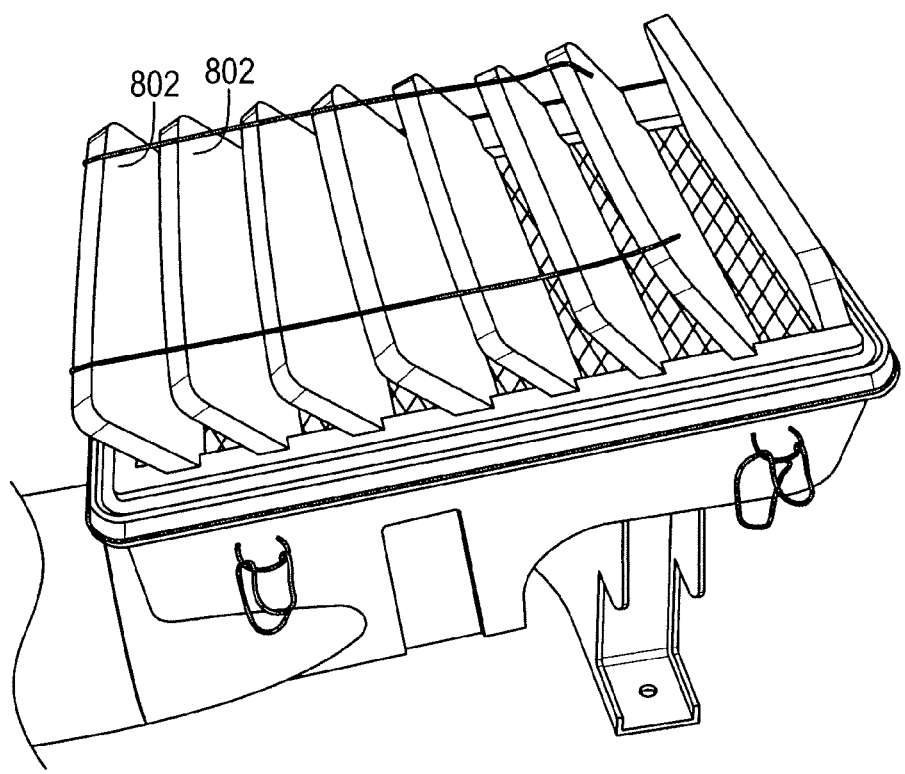

Referring to FIGS. 7 through 9, other foam placements within an air intake system housing are shown. FIG. 7 shows an angled panel of sound absorbing foam 702 positioned over the filter element 102. FIGS. 8 and 9 shows a plurality of strips 802 of sound absorbing foam positioned over the filter element 102. The plurality of strips 802 are spaced apart from one another, thereby permitting air to flow through the filter media and past the sound absorbing foam. In the arrangement of FIG. 9, each of the plurality of strips 802 are individually angled at a non-perpendicular angle with respect to a face of the filter media It should be noted that any use of the term "exemplary" herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another. It should be also be understood that, where the terms "approximately" and "about" are used, the identified dimensions and/or ranges are intended to cover slight variations that may result due to standard manufacturing and/or assembly tolerances as understood in the art.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A filter assembly, comprising:
    a filter media sized for positioning within an air induction system, the filter media possessing a first side and a second side substantially opposite the first side; and
    a layer of sound absorbing foam positioned adjacent one of the first side of the filter media and the second side of the filter media, the sound absorbing foam including a plurality of perforations therein, the plurality of perforations permitting air to flow through the filter media and the layer of sound absorbing foam, the plurality of perforations covering approximately 35 to 50 percent of a face of the layer of sound absorbing foam.

2. The filter assembly of claim 1, wherein the plurality of perforations are each approximately one inch in diameter.

3. The filter assembly of claim 1, wherein the plurality of perforations are each approximately three quarters of an inch in diameter.

4. The filter assembly of claim 1, wherein the layer of sound absorbing foam is perforated such that the perforations cover approximately 40 to 50 percent of the face of the layer of sound absorbing foam resulting in an open area in the range of about 40 to 50 percent of a total area of the face.

5. The filter assembly of claim 1, wherein the layer of sound absorbing foam is perforated such that the perforations cover approximately 35 to 40 percent of the face of the layer of sound absorbing foam resulting in an open area in the range of about 35 to 40 percent of a total area of the face.

6. The filter assembly of claim 1, wherein the first side is a dirty side configured to receive unfiltered air, and wherein the second side is a clean side configured to output filtered air.

7. The filter assembly of claim 6, wherein the sound absorbing foam is placed adjacent to the second side of the filter media.

8. The filter assembly of claim 6, wherein the sound absorbing foam is placed adjacent to the first side of the filter media.

9. The filter assembly of claim 1, wherein the layer of sound absorbing foam is adhered directly to the one of the first side of the filter media and the second side of the filter media.

10. The filter assembly of claim 1, wherein the layer of sound absorbing foam is positioned in a first section of the air induction system having a greater width than a second section of the air induction system that provides filtered air to a component.

11. A filter assembly, comprising:
    a filter media sized for positioning within an air induction system, the filter media possessing a first side and a second side substantially opposite the first side; and
    a plurality of strips of sound absorbing foam positioned adjacent one of the first side of the filter media and the second side of the filter media, the plurality of strips spaced apart from one another, thereby permitting air to flow through the filter media and past the layer of sound absorbing foam.

12. The filter assembly of claim 11, wherein each of the plurality of strips is angled at a non-perpendicular angle with respect to a face of the filter media.

13. An air induction system for an internal combustion engine, the system comprising:
    a filter assembly having a filter media and a sound absorbing foam, the filter media including a clean side and a dirty side substantially opposite the clean side, the dirty side configured to receive unfiltered air and the clean side configured to output filtered air, the sound absorbing foam positioned adjacent one of the clean side of the filter media and the dirty side of the filter media; and
    a turbocharger configured to provide filtered air to the internal combustion engine, the turbocharger positioned downstream of the clean side of the filter media;
    wherein the sound absorbing foam includes a plurality of perforations therein, the plurality of perforations permitting air to flow through the filter media and the sound absorbing foam.

14. The system of claim 13, wherein the plurality of perforations are each approximately one inch in diameter.

15. The system of claim 13, wherein the sound absorbing foam is perforated such that the perforations cover approximately 35 to 40 percent of a face of the sound absorbing foam resulting in an open area in the range of about 35 to 40 percent of a total area of the face.

16. The system of claim 13, wherein the sound absorbing foam is positioned adjacent to the clean side of the filter media.

17. The system of claim 13, wherein the sound absorbing foam is positioned adjacent to the dirty side of the filter media.

18. The system of claim 13, wherein the sound absorbing foam is adhered directly to one of the clean side or the dirty side of the filter media.

19. The system of claim 13, wherein the sound absorbing foam includes a plurality of strips of sound absorbing foam.

20. The system of claim 19, wherein the plurality of strips are spaced apart from one another thereby permitting air to flow through the filter media and past the sound absorbing foam.

21. The system of claim 19, wherein the plurality of strips are angled at a non-perpendicular angle with respect to a face of the filter media.

* * * * *